United States Patent [19]
Dimitriadis et al.

[11] Patent Number: 5,513,241
[45] Date of Patent: Apr. 30, 1996

[54] LOW COST ACKNOWLEDGE-BACK SYSTEM FOR A PAGER USING EXISTING INFRASTRUCTURE

[75] Inventors: Dimitri Dimitriadis, Lake Oswego; Garold B. Gaskill, Tualatin, both of Oreg.

[73] Assignee: Seiko Communications Systems, Inc., Beaverton, Oreg.

[21] Appl. No.: 335,458

[22] Filed: Nov. 7, 1994

Related U.S. Application Data

[63] Continuation-in-part of Ser. No. 304,782, Sep. 12, 1994.

[51] Int. Cl.⁶ .................................................. H04Q 7/12
[52] U.S. Cl. ................................................ 379/57; 379/56
[58] Field of Search ................................ 379/56, 57, 58, 379/61; 455/7, 11.1, 14, 31.1, 32.1; 340/825.18, 825.44, 311.1, 313

[56] References Cited

U.S. PATENT DOCUMENTS

| | | |
|---|---|---|
| 4,823,123 | 4/1989 | Siwiak . |
| 4,875,038 | 10/1989 | Siwiak et al. . |
| 4,882,579 | 11/1989 | Siwiak . |
| 4,891,637 | 1/1990 | Siwiak et al. . |
| 4,940,963 | 7/1990 | Gutman et al. . |
| 5,124,697 | 6/1992 | Moore . |
| 5,142,279 | 8/1992 | Jasinski et al. . |
| 5,150,110 | 9/1992 | Breeden . |
| 5,153,582 | 10/1992 | Davis . |
| 5,260,700 | 11/1993 | Merchant et al. . |

*Primary Examiner*—Curtis Kuntz
*Assistant Examiner*—Michael B. Chernoff
*Attorney, Agent, or Firm*—Elmer Galbi

[57] ABSTRACT

A low cost acknowledge-back system for a pager includes a small, portable plug-in module with a telephone connector for coupling to an existing telephone network. Paging devices interact with plug-in modules through a wireless infrared (IR) link. When a paging device comes within communication range of a module, automated interaction therebetween allows the paging device to acknowledge to a paging system successful delivery of a given paging message. The system further includes multiple levels of acknowledgement including acknowledgement of message receipt and message read events at the paging device. Further, the system includes automatic and manual response functions allowing the user of the paging device to initiate automatically or manually a telephone connection using the telephone number of a telephone number message to respond to a given telephone number message.

15 Claims, 5 Drawing Sheets

| 120 | COMMAND | CONTENT |
|---|---|---|
| 120a | RECEIPT | command id, message number, caller's telephone number |
| 120b | READ | command id, message number |
| 120c | RESPOND | command id, message number |

FIG. 5A

| 122 | COMMAND | CONTENT |
|---|---|---|
| 122a | RECEIPT ACK | command id, message number |
| 122b | READ ACK | command id, message number |
| 122c | RESPOND ACK | command id, message number |

LOW COST ACKNOWLEDGE-BACK SYSTEM FOR A PAGER USING EXISTING INFRASTRUCTURE

RELATED APPLICATION

The present application is a continuation-in-part of co-pending U.S. patent application Ser. No. 08/304,782 entitled ACKNOWLEDGE BACK PAGER USING SECONDARY TRANSMISSION SOURCE, and filed Sep. 12, 1994 by at least one inventor in common with the present invention and assigned in common to the assignee of the present invention.

FIELD OF THE INVENTION

The present invention relates generally to communication systems, and particularly to paging systems including acknowledge-back features.

BACKGROUND OF THE INVENTION

Paging systems establish a one way communication channel providing information, e.g., telephone numbers or messages, to remote paging devices travelling within a reception area. An acknowledge signal originating from the paging device improves the paging system. For example, receiving an acknowledge-back signal benefits the paging system in verifying a given message transmitted via radio signal successfully arrived at the intended paging device.

Paging systems incorporating acknowledge-back features generally require extensive and complex implementation, i.e., elaborate protocol modification and sophisticated additional radio signal circuitry. For example, U.S. Pat. No. 5,260,700, issued Nov. 9, 1993 proposes enhanced throughput in simulcast communication systems by use of a selective call receiver system including a plurality of base sites capable of simultaneous operation. U.S. Pat. No. 5,162,790 issued Nov. 10, 1992 shows a multiple transmitter paging system including a central station having a plurality of acknowledge-back receivers, each operating on separate individual channels whereby a plurality of remote stations, each with a acknowledge-back receiver, selectively receives acknowledge-back responses on each of the individual channels. U.S. Pat. No. 5,142,279 issued Aug. 25, 1992 shows an acknowledge-back paging system having the capability of matching variable length data messages to pager addresses by selecting an order of transmission for variable length messages. U.S. Pat. No. 5,124,697 shows an acknowledge-back pager method for acknowledging the reception of an address signal by transmitting acknowledge signals determined at least in part by the received address signals positioned in a group of address signals to avoid simultaneous transmission of acknowledge signals. U.S. Pat. No. 4,940,963 issued Jul. 10, 1990 shows a paging system with acknowledge-back capability including immediate indication of message receipt to the paging system caller when a pager immediately acknowledges a paging message, and immediate indication of failure to deliver to the paging system caller when the pager fails to immediately acknowledge a paging message. U.S. Pat. No. 4,825,193 issued Apr. 25, 1989 shows an acknowledge-back pager system wherein a group of acknowledge-back pagers acknowledge simultaneously, but on different frequencies allocated dynamically to pagers in the group.

Some acknowledge-back pager systems suffer for excess complexity or significant modification to broadcast protocol otherwise used. Introducing additional complex radio signal circuitry or modification to paging system broadcast protocol is reflected in increased cost of acknowledge-back features to the users of the paging system.

It is desirable to provide an acknowledge-back capability in a paging device without incurring the substantial burden in expense and additional complex equipment typically required when incorporating broadcast of an acknowledge signal from a paging device.

SUMMARY OF THE INVENTION

The present invention provides acknowledge-back capability in a paging system with a low cost module coupling to the existing telephone network and interacting locally with a paging device to collect paging device transmissions and forward such transmissions to the paging system by way of the existing telephone network connection.

An acknowledge-back paging system under the present invention includes a paging message broadcast facility providing paging messages by radio signal and also coupled to the existing telephone network. A paging device receiving the paging messages includes a wireless transmission device. The paging device transmits an acknowledge signal in response to receiving a given paging message. A personal acknowledge module responsive to the paging device acknowledge signal couples to the telephone network at a user selected telephone jack whereby the module forwards the acknowledge signal to the broadcast facility.

In accordance with a second aspect of the present invention, a paging system acknowledge-back module includes a wireless communication link collecting a first command and transmitting a second command. The module also includes a telephone network connection which allows coupling to a user selected telephone jack and interaction on the existing telephone network. A control function of the module monitors collection of the first command and provides in response thereto the second command through the wireless communication link. The module then reports by way of telephone network occurrence of the exchange of the first command and second command on the wireless communication link.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
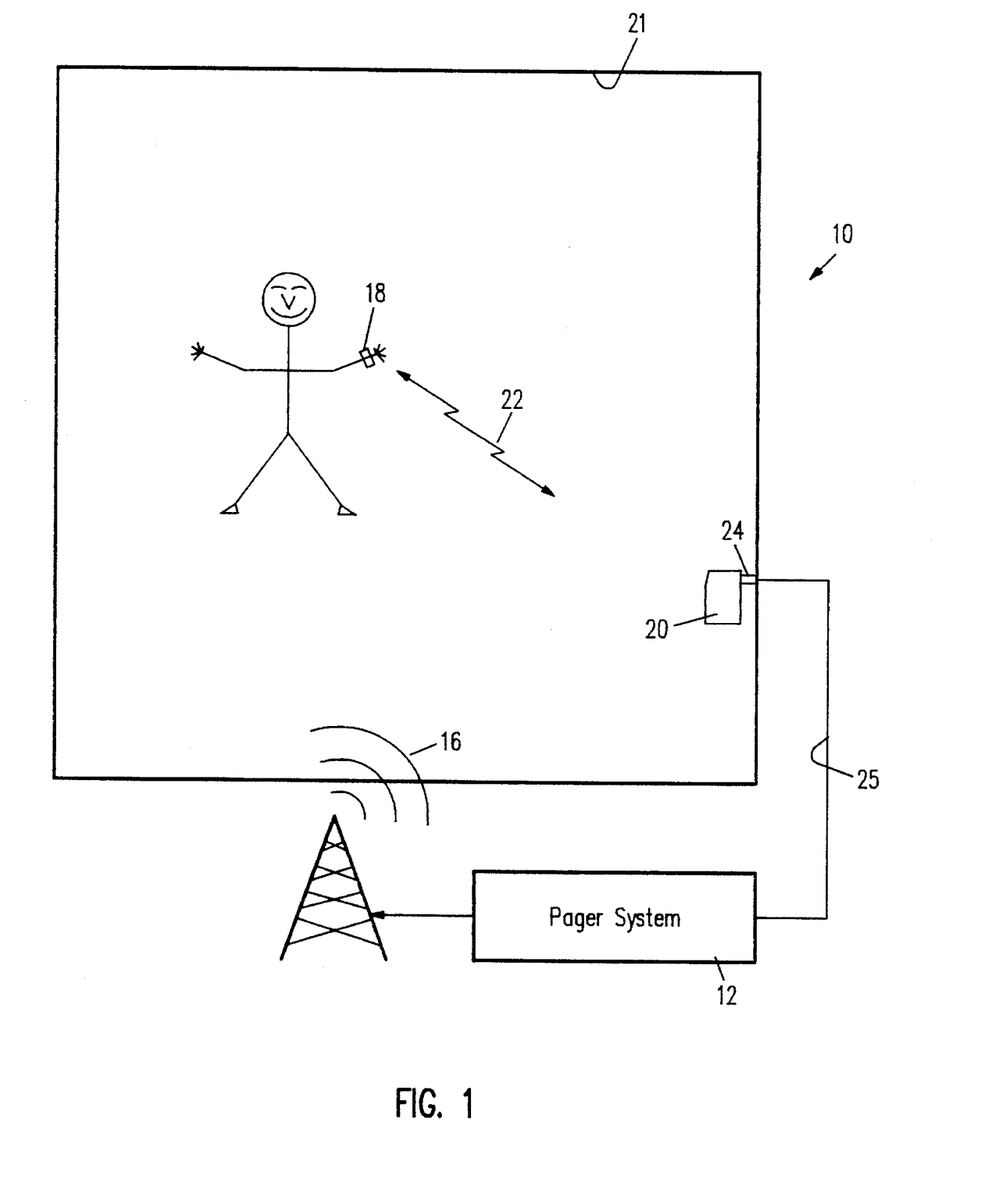
FIG. 1 illustrates generally an acknowledge-back system for a pager in accordance with a preferred embodiment of the present invention.

FIG. 1 illustrates a low cost acknowledge-back system 10 using existing infrastructure in accordance with a preferred embodiment of the present invention. In FIG. 1, acknowledge-back system 10 includes a paging system 12 providing by radio broadcast signal 16 paging messages to a wristwatch paging device 18. System 10 further includes an acknowledge module 20 located at a user selected site, e.g. in a room 21. When paging device 18 is in room 21, module 20 and paging device 18 interact via bi-directional wireless infrared (IR) link 22. Because module 20 interacts with paging system 12 via telephone network 25, device 18 can deliver information also to paging system 12. Module 20 is a low cost device coupling a paging device 18 signal to paging system 12. In particular, module 20 allows a paging device 18 to acknowledge to paging system 12 successful capture of a given paging message by the paging device.

Acknowledge-back system 10 provides the desirable feature of message acknowledgement, but at low cost and with great convenience, i.e., automatic operation by attachment to a selected telephone jack of telephone network 25. System 10 employs, generally, existing infrastructure, e.g., paging system 12 and telephone network 25. Module 20 simply plugs into a user selected telephone jack as such are commonly available for use. Each module 20 can be carried by the user of device 18 for mounting into a selected telephone jack, e.g., carried to locations visited, or can be left at a selected location. Because each module 20 is inexpensive, a user of device 18 can own several modules 20, leaving several at locations frequently visited and carrying one for use at other locations less frequently visited.

In operation, paging system 10 issues a paging message by way of broadcast signal 16 to device 18. Upon receiving the paging message, device 18 transmits by way of IR link 22 an acknowledgement of the just-received paging message. Module 20 receives the acknowledgement by way of link 22 and forwards the acknowledgement by way of telephone network 25 to paging system 12. Upon receiving the acknowledgement from module 20, paging system 12 reacts by, for example, ceasing further transmission of that paging message and/or registering successful delivery of a given message. Module 20 also transmits, upon receiving a message acknowledgement from device 18, to device 18 confirmation of acknowledgement, whereby device 18 ceases further production of the paging message acknowledgement signal to module 20.

Figure 2:
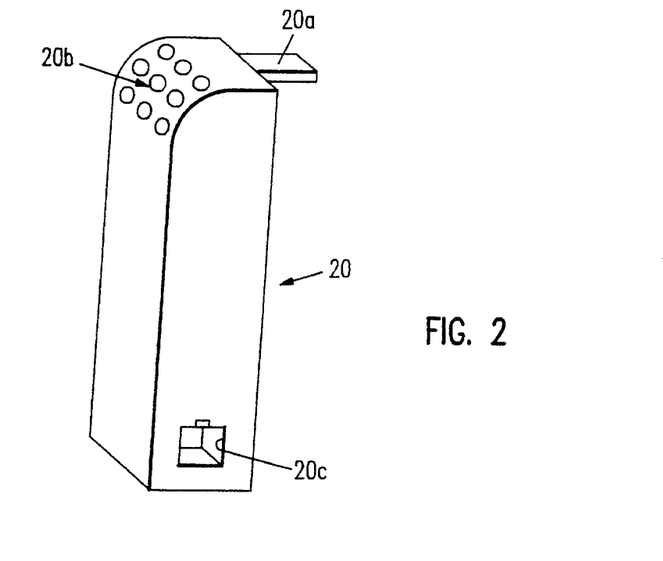
FIG. 2 illustrates in perspective a plug-in module of the answer-back system of FIG. 1.

FIG. 2 illustrates in perspective the low cost, small, personal, and portable nature of module 20. In FIG. 2, module 20 includes a male RJ-11 jack 20a for coupling to a telephone network, i.e., plugging into the wall at a location visited. Simply plugging module 20 into an available telephone jack places module 20 into operation. An array of IR sensors/emitters 20b collects information from and delivers information to bi-directional IR link 22. While illustrated with the IR sensors/emitters 20b integral to module 20, it will be understood that sensors/emitters 20b distribution, location, and orientation may be arranged according to a variety of patterns and locations with respect to module 20 including remote locations, if needed, for interaction on link 22. Module 20 further includes a female RJ-11 jack 20c allowing coupling of a telephone to module 20.

Figure 3:
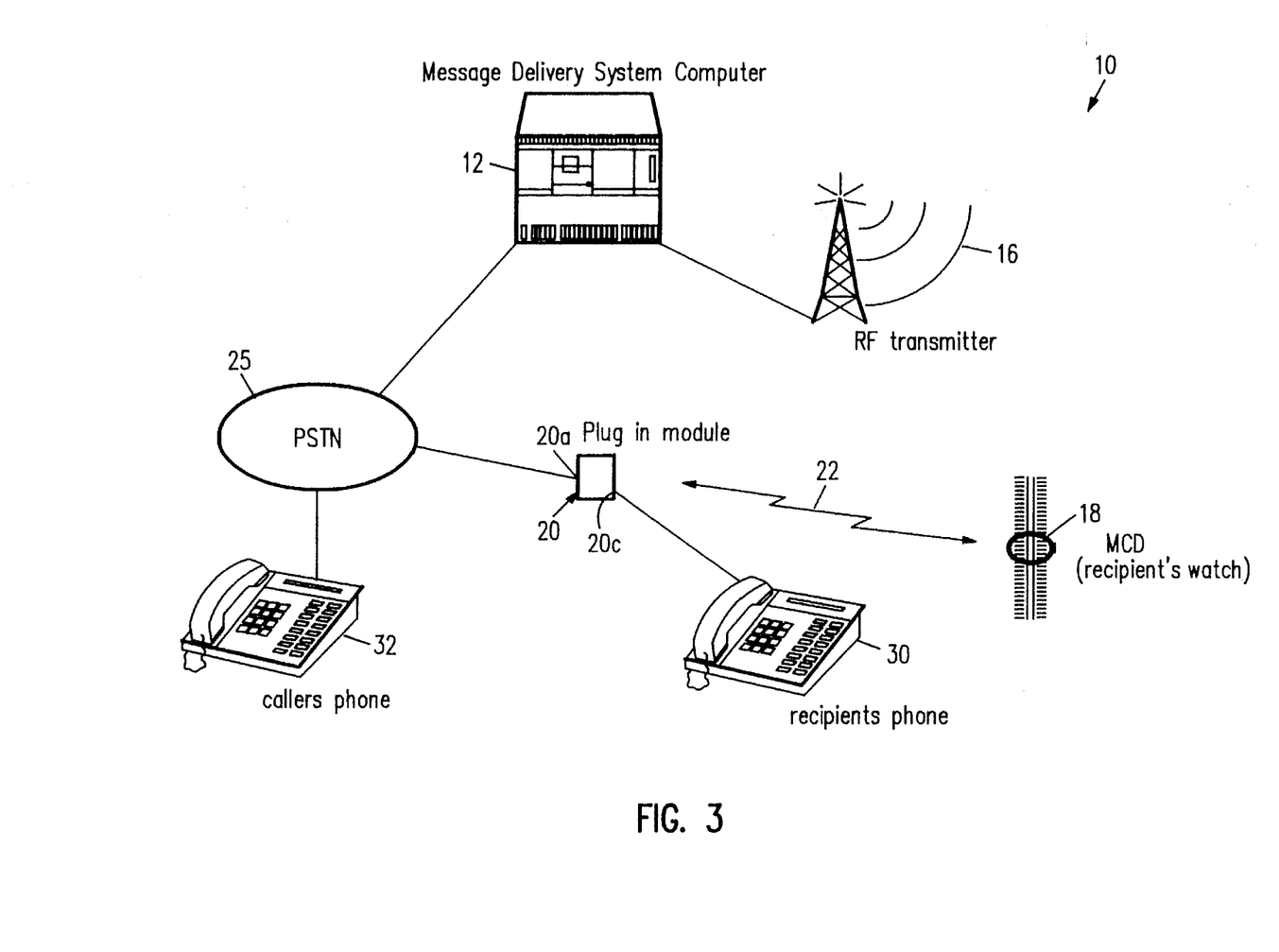
FIG. 3 illustrates the answer-back system of FIG. 1 also including a caller's phone and a recipient's phone according to an enhanced implementation of the present invention.

FIG. 3 illustrates system 10 including further a recipient's phone 30 coupled to module 20 at jack 20c. As in FIG. 1, device 18 interacts with module 20 via IR link 22. Device 18 receives paging messages from paging system 12, i.e., a message delivery system computer 12, driving paging signal broadcast 16. Module 20 interacts via public switch telephone network (PSTN) 25 with message delivery system computer 12 and generally with other devices on telephone network 25, e.g., a caller's phone 32. For example, caller's phone 32 is the telephone of a caller initiating through paging system 12 a telephone number paging message delivered to device 18. The user of telephone 32 expects a return call from the user of device 18 at caller's phone 32.

Figure 4:
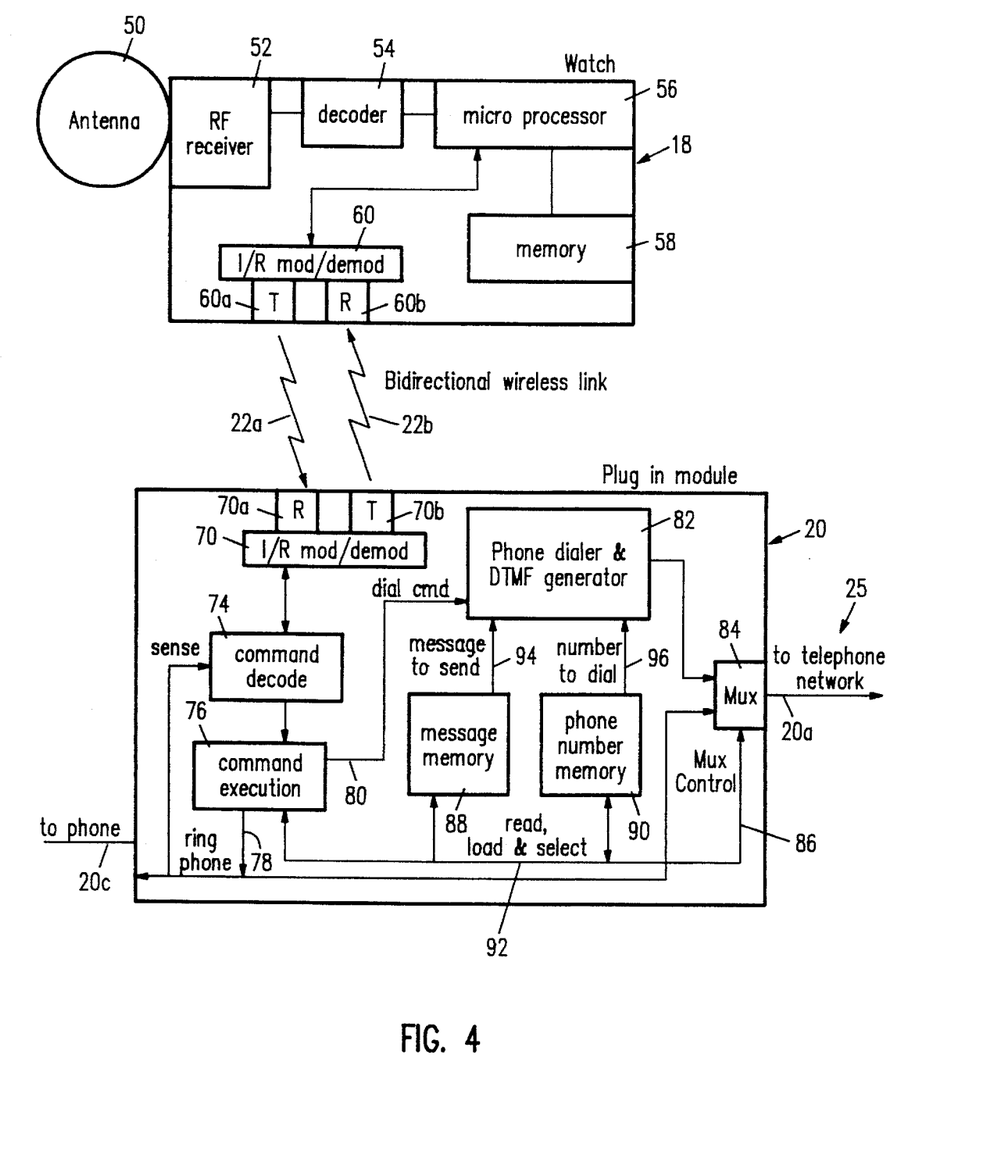
FIG. 4 illustrates in block diagram a paging device and the plug-in module of the present invention as interconnected by infrared (IR) bi-directional wireless link.

FIG. 4 illustrates in block diagram paging device 18 and module 20 as interconnected through bi-directional IR link 22. In FIG. 4, device 18 includes an antenna 50 for collecting paging signal broadcast 16. An RF receiver 52 of device 18 applies the received radio signal broadcast 16 to a decoder 54. Decoder 54 executes a variety of procedures relative to incoming information, and generally passes along to microprocessor 56 paging messages addressed to that particular paging device 18. As may be appreciated, microprocessor 56 has a memory 58 in implementation of its programming, including storage of certain telephone numbers triggering automatic call-back to a caller's phone. Microprocessor 56 interacts with an IR modulation/demodulation block 60. In particular, a transmitter 60a of block 60 broadcasts link portion 22a to module 20. A receiver block 60b collects link portion 22b as broadcast by module 20. Thus, microprocessor 56 interacts with module 20 via IR modulation/demodulation module 60. As will be explained more fully hereafter, a set of link 22 commands facilitate interaction between device 18 and module 20.

Module 20 also includes an IR modulation/demodulation block 70. A receiver 70a of block 70 collects link portion 22a and a transmitter 70b of device 70 broadcasts link portion 22b. Command decode block 74 injects commands onto link portion 22b and decodes commands received via link portion 22a. Commands decoded by block 74 are delivered to a command execution block 76. Command execution block 76 generates a RING PHONE command 78 to ring a telephone coupled to jack 20c, i.e., the device 18 user's or recipient's phone 30. Command execution block 76 also issues a DIAL command 80 delivered to a phone dialer and DTMF generator 82. Generator 82 couples via multiplexor 84 to jack 20a for interaction on telephone network 25. Multiplexor 84 also couples to jack 20c, whereby a multiplexor control signal 86 selectively allows the recipient telephone 30 to operate on the telephone network 25. For example, command execution block 76 places an outgoing call by issuing a DIAL command 80 and causing generator 82 to place and connect the call. Command execution block 76 then couples the telephone call connected to jack 20a to the recipient's telephone 30 connected to jack 20c.

Command execution block 76 further manipulates a message memory 88 and a phone number memory 90. By appropriately manipulating a READ, LOAD and SELECT command 92, command execution block 76 loads and reads data relative to message memory 88 and phone number memory 90. Command execution block 76, when necessary, retrieves phone numbers from phone number memory 90. For example, command execution block 76 establishes a message to send 94 as taken from message memory 88 and a number to dial 96 as taken from phone number memory 90 for application to phone dialer and DTMF generator 82 in implementation of a given DIAL command 90.

Figure 5A:
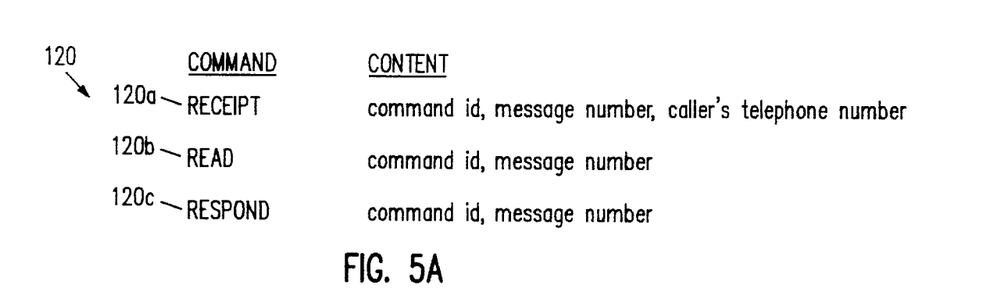
FIGS. 5A and 5B illustrate command sets transmitted via the wireless link by the paging device and plug-in module, respectively.
Figure 5B:
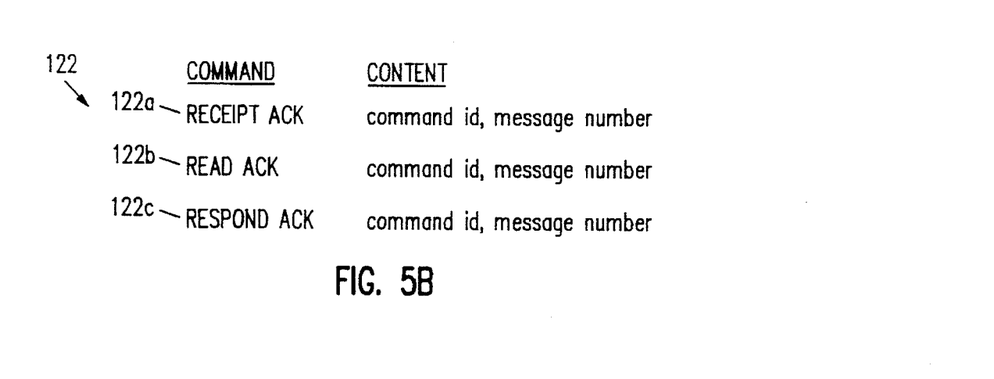

FIGS. 5A and 5B illustrate a simplified command set exchanged via IR link 22 between paging device 18 and module 20. While a variety of commands may be implemented in an expanded command set, the command set illustrated includes commands (FIG. 5A) issued by device 18 to module 20 in response to receipt of paging messages and user manipulation of device 18 and includes commands (FIG. 5B) issued by module 20 to device 18 as acknowledgement.

In FIG. 5A, device 18 commands 120 include a RECEIPT command 120a, a READ command 120b, and a RESPOND command 120c. Device 18 issues RECEIPT command 120a when device 18 successfully captures a paging message directed to it. The particular RECEIPT command 120a illustrated in FIG. 5A indicates receipt of a telephone number paging message. Thus, RECEIPT command 120a includes a command ID field, a message number field, and a caller's telephone number field. The command ID field represents the command, e.g., the command ID field for command 120a represents "receipt." Further, the command ID field includes data identifying the particular paging device 18, i.e., a serial number. In this manner, module 20 identifies not only a command, but also the identity of device 18 issuing the command. This avoids confusion when several such devices 18 are present in proximity to module 20.

The message number field differentiates among a recent sequence of messages transmitted to a paging device 18. For example, message numbers for paging messages are assigned modulo 32 and the last 32 messages transmitted to paging device 18 have unique message numbers. The caller's telephone number field is the telephone number portion of the telephone number paging message delivered to paging device 18. The paging message author, i.e., caller, wishes the recipient, i.e., user of device 18, to dial this number in response to the paging message. Thus, when paging device 18 issues the RECEIPT command 120a, it provides to module 20 a message number to differentiate among recently received messages and a telephone number to be dialed.

Paging device 18 issues the READ command 120b when the user of device 18 manipulates device 18 in such manner to display or "read" a message. READ command 120b includes a command ID field including device 18 identification as described above and a message number field representing the number of the message the user has just read.

A user of device 18 causes transmission of the RESPOND command 120c. Upon appropriate manipulation of device 18 by the user thereof, device 18 issues RESPOND command 120c to module 20. RESPOND command 120c includes a command ID field and a message number field corresponding to the message to which the user of device 18 wishes to respond, i.e., place a return phone call to the caller initiating the telephone number message.

Module 20 commands 122 include a RECEIPT ACKNOWLEDGE command 122a, a READ ACKNOWLEDGE command 122b, and a RESPOND ACKNOWLEDGE command 122c. Module commands 122a–122c correspond to paging device commands 120a–120c, respectively. Thus, for each command 120 issued by device 18, module 20 has a corresponding acknowledgement command to confirm successful delivery of a command 120 to module 20. Each of commands 122 include a command ID field and a message number field. The command ID field issued by module 20 includes identification of a particular paging device 18, e.g., a serial number unique to each paging device 18. In this manner, module 20 broadcasts commands 122 each to a specific paging device 18. The message number field allows device 18 and module 20 to interact with reference to a variety of recently received messages in any particular order received or as dictated by the user of device 18.

Several levels of interaction and acknowledgement exist between device 18 and module 20, including acknowledgement as a function of user manipulation of device 18. When a paging message is received, device 18 sounds, if enabled, an alarm and presents an "envelope" icon on the display of device 18. At this level, i.e., when device 18 has received a paging message, an acknowledgement to module 20, and eventually to paging system 12, occurs. When the user hears the audible alarm, or later sees the envelope icon, the user presses a message read button of device 18 to sequence through a series of messages stored in device 18 beginning with the most recently received message. At this level, i.e., when the user has read a given message, device 18 transmits a message read command to module 20 for submission as an acknowledge signal to paging system 12. Each message stored in device 18 bears an associated message number. Message numbers are calculated modulo 32 whereby the 32 most recent messages transmitted to device 18 bear unique message numbers. As described more fully hereafter, a user of device 18 scans through a sequence of stored messages and selects a given telephone number message for response. Device 18 instructs module 20 to dial the desired telephone number and thereby respond to a telephone number message stored in device 18. At this level, i.e., a user initiating a return telephone call from the paging device 18, such return call by the paging device user may also be logged with paging system 12 by way of module 20.

Figure 6:
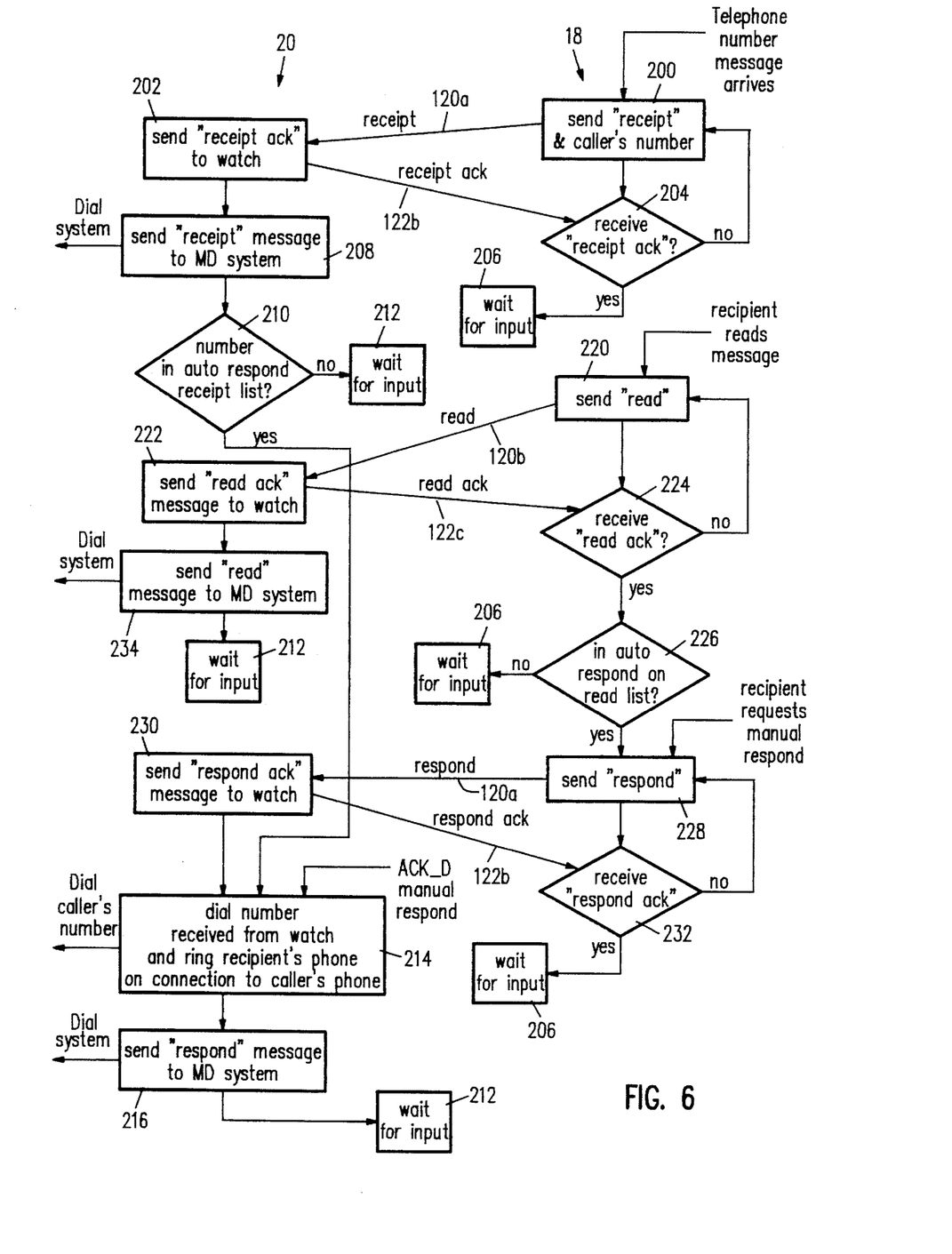
FIG. 6 illustrates by flow chart control relationships between the plug-in module and paging device in production of and response to the commands of FIGS. 5A and 5B.

FIG. 6 illustrates by flow chart interaction between device 18, by flow control blocks on the right side of FIG. 6, and module 20, by flow control blocks on the left side of FIG. 6, using exchange of commands 120 and 122 shown spanning the left and right sides of FIG. 6. Paging device 18 initiates interaction by transmitting one of commands 120 and expects in return transmission by module 20 of one of commands 122. Paging device 18 need not constantly broadcast commands 120, however, and should be programmed to only intermittently initiate, i.e., seek, interaction with module 20. This conserves device 18 battery energy. For example, a limited duty cycle on the order of one millisecond every ten seconds significantly conserves battery energy while also regularly allowing paging device 18 to initiate interaction with module 20. Once paging device 18 establishes communication with module 20, interaction occurs as illustrated in FIG. 6.

In FIG. 6, when a telephone number message arrives and device 18 sounds its alarm, if enabled, processing passes to block 200 where device 18 transmits via link 22 the RECEIPT command 122a. As noted above, the RECEIPT command 120a includes, in addition to a command ID field, a message number field and a telephone number field. Thus, the RECEIPT command 120a as delivered to module 20 carries specific information concerning the paging message received by device 18, i.e., bears the associated message number and telephone number contained in the paging message received by device 18. In block 202, when module 20 receives the RECEIPT command 120a from device 18, it transmits via link 22 the RECEIPT ACKNOWLEDGE command 122b. Decision block 204 of device 18 determines whether the RECEIPT ACKNOWLEDGE command 122b transmitted by module 20 has been detected. If the RECEIPT ACKNOWLEDGE command 122b has not yet been detected, processing loops at block 204 returning to block 200 whereat device 18 again transmits the RECEIPT command 120a. When the RECEIPT ACKNOWLEDGE command is received at device 18, processing branches from decision block 204 to an idle "wait for input" block 206. Device 18 thereby informs module 20 upon receiving a paging message, in this case a telephone number paging message via RECEIPT command 120a, and confirms delivery of the RECEIPT command 120a to module 20.

Upon detecting the RECEIPT command 120a from device 18, processing in module 20 advances to block 208 where module 20 dials paging system 12 and acknowledges delivery of a paging message to a paging device 18, i.e., forwards the RECEIPT command 120a to paging system 12. Processing at module 20 then advances to decision block 210 where module 20 compares the telephone number provided with RECEIPT command 120a with a set of telephone numbers stored in phone number memory 90 including some marked for automatic response. Telephone numbers marked for automatic response trigger programming in device 20 to initiate a telephone call to the telephone number indicated in a telephone number paging message. If the telephone number is not marked for automatic response, processing branches to idle "wait for input" block 212 of module 20.

For automatic response, processing branches at decision block 210 to block 214 where module 20 dials the indicated telephone number received from device 18 to dial the caller's telephone number, i.e., dial telephone 32. Upon establishing connection with telephone 32, module 20 then rings the recipient's telephone 32 and thereby establishes a telephone connection between telephones 30 and 32. In this manner, module 20 facilitates automated response to a given source of telephone number paging messages. Following block 214, processing in module 20 advances to block 216 where module 20 dials system 12 and forwards the "RESPOND" message to the message delivery system computer 12. Following block 216, module 20 enters the "wait for input" block 212.

Thus, delivery of a paging message to device 18 triggers a sequence of events in and interaction between device 18 and module 20 accomplishing such tasks as informing paging system 12 of successful delivery of a message to a given device 18, automated response to a caller initiating a telephone number paging message, and informing paging system 12 of the automated response to caller step.

A second event triggering activity between device 18 and module 20 occurs when the user of device 18 reads a message, e.g., in response to the envelope icon on the paging device 18 display presses the message read button to sequence through a series of stored messages. When the user of device 18 reads a message, processing in block 220 of device 18 causes transmission of the READ command 120b. In response to transmission of the READ command 120b, module 20 transmits in block 222 the READ ACKNOWLEDGE command 122c. Device 18 detects in decision block 224 transmission of the READ ACKNOWLEDGE command 122c. Processing loops between decision block 224 and block 220 until device 18 detects in decision block 224 transmission of the READ ACKNOWLEDGE command 122c from module 20.

Device 18 then continues to decision block 226 where the telephone number of the telephone number message is compared to a list of numbers marked for automated response. If the telephone number of the subject telephone number message is not found marked for automatic response, then processing branches from decision block 226 to "wait for input" block 206 of device 18. Otherwise, processing branches from decision block 226 to block 228.

In block 228, device 18 transmits the RESPOND command 120a to module 20. Upon receiving the RESPOND command 120a, module 20 broadcasts in block 230 the RESPOND ACKNOWLEDGE command 122b. Device 18 detects transmission of the RESPONSE ACKNOWLEDGE command 122b in decision block 232. Processing loops between blocks 228 and 232 of device 18 until module 20 successfully receives the RESPOND command 120a and delivers the RESPOND ACKNOWLEDGE command 122b to device 18. Following decision block 232, processing in device 18 branches to the "wait for input" block 206.

A second access point to block 228 occurs when the recipient requests manually that device 18 respond to a given stored telephone number message. For example, the user of device 18 presses and holds the message read button to indicate to device 18 a desire to respond to the currently displayed paging message. Under such entry conditions to block 228, the RESPOND command 120a transmitted to module 20 bears the message number associated with the message indicated manually for response by the user of device 18.

Returning to module 20, upon receiving the READ command 120b from device 18, processing advances to block 234 where module 20 forwards the READ command 120b to paging system 12 and then enters the "wait for input" block 212 of module 20. In this manner, system 12 is informed not only that the paging device 18 has successfully received a given paging message, but also that the user of a given device 18 has displayed for reading a particular paging message.

When module 20 receives the RESPOND command 120a from device 18, processing advances to block 214 and module 20 initiates a response call as described herein above. In other words, the message number provided with RESPOND command 120a indicates a telephone number in telephone number memory 90 allowing module 20 to place the desired telephone call, i.e., dial the caller's phone 32.

Another event triggering module 20 to dial a selected telephone number is represented by the "ACK_D manual respond" entry path to block 214. This programming represents, for example, user manipulation of input buttons (not shown) on module 20 to cause dialing and connection to a telephone represented by a telephone number stored within module 20.

It will be appreciated that the present invention is not restricted to the particular embodiment that has been described and illustrated, and that variations may be made therein without departing from the scope of the invention as found in the appended claims and equivalents thereof. For example, while the specific example shown is for telephone number messages, acknowledging message receipt at a paging device and acknowledging message read at a paging device may be applied to a variety of message types beyond merely telephone number messages.

What is claimed is:

1. An acknowledge-back paging system comprising:

a paging message broadcast facility providing paging messages by radio signal and coupled to a pre-existing telephone network;

a remote paging device receiving said paging messages, said paging device further including a wireless transmission device whereby said paging device transmits an acknowledge signal in response to receiving a given paging message;

a personal acknowledge module responsive to said acknowledge signal and coupled to a selected jack of said pre-existing telephone network whereby upon receiving from said paging device said acknowledge signal said module forwards said acknowledge signal to said broadcast facility by telephone signal.

2. A system according to claim 1 wherein said acknowledge module includes a second wireless transmission device and said paging device responds to wireless transmissions of said acknowledge module.

3. A system according to claim 2 wherein said first mentioned and said second wireless transmission devices are infrared transmission devices.

4. A system according to claim 1 wherein said wireless transmission device is an infrared transmission device.

5. A system according to claim 1 wherein said acknowledge signal transmitted by said paging device indicates at least one of paging message receipt at said paging device, paging message read at said paging device, and response to paging message received at said paging device.

6. A system according to claim 1 wherein at least one of said paging device and said acknowledge module includes a set of stored telephone numbers, and said at least one of said paging device and said acknowledge module detects a paging message telephone number bearing a telephone number matching a member of said set and initiates a telephone call at said telephone number through said telephone network.

7. In a paging system coupled to a pre-existing telephone network and providing by radio signal transmission paging messages to a plurality of remote paging devices, an acknowledge-back module comprising:

a first wireless communication device collecting a first command and transmitting a second command in response to said first command;

a telephone network connector for interaction at a selected jack of said pre-existing telephone network; and a control function monitoring exchange of said first and second commands at said wireless communication device and reporting said exchange to said paging system through said telephone network.

8. A module according to claim 7 wherein said wireless communication device is a bi-directional infrared communication device.

9. A module according to claim 7 wherein said first command is a message received signal provided to said acknowledge-back module by one of said plurality of paging devices receiving one of said paging messages, and said second command is acknowledgement by said module to said one paging device indicating reception of said message received signal at said module.

10. A module according to claim 7 wherein said first command is a message read signal provided to said acknowledge-back module by one of said plurality of paging devices receiving said one of said paging messages, and said second command is acknowledgement by said module to said one paging device indicating reception of said message read signal at said module.

11. A module according to claim 7 wherein said first command is a respond to caller signal provided to said acknowledge-back module by one of said plurality of paging devices receiving one of said paging messages, and said second command is acknowledgement by said module to said one paging device indicating reception of said respond to caller signal at said module.

12. In a paging system including a preexisting paging message broadcast facility transmitting paging messages to a plurality of remote paging devices and including a preexisting telephone network delivering information, including paging messages to be broadcast, to said paging system, an acknowledge-back improvement comprising:

at least one of said plurality of remote paging devices including a wireless transmission device and a control function providing a first acknowledge signal via said wireless transmission device in response to receiving one of said paging messages from said paging broadcast facility; and a personal acknowledge module including a telephone network connector for interaction at a selected jack of said pre-existing telephone network, a reception device responsive to said acknowledge signal of said wireless transmission device, and a control function providing to said paging system a second acknowledge signal via said telephone network connector connected to said selected jack in response to detecting at said reception device said first acknowledge signal.

13. Am improvement according to claim 12 wherein at least one of said first and second acknowledge signals identify said paging message among a plurality of paging messages.

14. An improvement according to claim 12 wherein said wireless transmission device is an infrared signal transmission device and said reception device is an infrared signal reception device.

15. An improvement according to claim 12 wherein said module includes a second wireless transmission device said paging device includes a second reception device responsive to said second wireless transmission device.

* * * * *